US010224571B2

(12) United States Patent
Yang et al.

(10) Patent No.: US 10,224,571 B2
(45) Date of Patent: Mar. 5, 2019

(54) FLUORINATED ETHER AS ELECTROLYTE CO-SOLVENT FOR LITHIUM METAL BASED ANODE

(71) Applicant: GM GLOBAL TECHNOLOGY OPERATIONS LLC, Detroit, MI (US)

(72) Inventors: Li Yang, Troy, MI (US); Mei Cai, Bloomfield Hills, MI (US); Fang Dai, Troy, MI (US); Gayatri V. Dadheech, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 176 days.

(21) Appl. No.: 15/253,951

(22) Filed: Sep. 1, 2016

(65) Prior Publication Data

US 2018/0062206 A1   Mar. 1, 2018

(51) Int. Cl.
| | |
|---|---|
| *H01M 4/02* | (2006.01) |
| *H01M 4/38* | (2006.01) |
| *H01M 4/58* | (2010.01) |
| *H01M 4/66* | (2006.01) |
| *H01M 4/134* | (2010.01) |
| *H01M 4/505* | (2010.01) |
| *H01M 4/525* | (2010.01) |
| *H01M 10/052* | (2010.01) |
| *H01M 10/0525* | (2010.01) |
| *H01M 10/0568* | (2010.01) |
| *H01M 10/0569* | (2010.01) |

(52) U.S. Cl.
CPC ....... *H01M 10/0569* (2013.01); *H01M 4/134* (2013.01); *H01M 4/382* (2013.01); *H01M 4/505* (2013.01); *H01M 4/525* (2013.01); *H01M 4/5825* (2013.01); *H01M 4/661* (2013.01); *H01M 10/052* (2013.01); *H01M 10/0525* (2013.01); *H01M 10/0568* (2013.01); *H01M 2004/021* (2013.01); *H01M 2300/0034* (2013.01); *H01M 2300/0037* (2013.01)

(58) Field of Classification Search
CPC .......... H01M 10/0569; H01M 10/052; H01M 10/0525; H01M 10/0568; H01M 4/134; H01M 4/382; H01M 4/505; H01M 4/525; H01M 4/5825; H01M 4/661; H01M 2004/021; H01M 2300/0034
See application file for complete search history.

(56) References Cited

U.S. PATENT DOCUMENTS

| | | | | |
|---|---|---|---|---|
| 5,750,282 | A * | 5/1998 | Chi | H01M 6/5072 29/623.5 |
| 2007/0212615 | A1* | 9/2007 | Jost | H01M 10/0567 429/326 |
| 2010/0028785 | A1* | 2/2010 | Choi | H01M 10/0525 429/337 |
| 2010/0248025 | A1* | 9/2010 | Kimura | H01M 10/052 429/207 |
| 2013/0040185 | A1* | 2/2013 | Takase | H01M 2/1686 429/145 |
| 2013/0149596 | A1* | 6/2013 | Shiflett | H01M 10/056 429/163 |
| 2013/0266847 | A1* | 10/2013 | Noguchi | H01M 10/0525 429/163 |
| 2013/0280600 | A1* | 10/2013 | Uehara | H01M 4/505 429/200 |

FOREIGN PATENT DOCUMENTS

JP          2004363031 A   * 12/2004

OTHER PUBLICATIONS

Linden "Handbook of Batteries—Chapter 34—Rechargeable Lithium Batteries", Third Ed. (Year: 2002).*
Han et al. "Lithium bis(fluorosulfonyl) imide (LiFSI) as conducting salt for nonaqueous liquid electrolyte for lithium-ion batteries: Physiochemical and electrochemical properties" Journal of Power Sources 196, pp. 3623-3632. (Year: 2010).*
Jiangfeng Qian et al; High rate and stable cycling of lithium metal anode; nature communications; article; Received Nov. 10, 2014; Accepted Jan. 23, 2015; Published Feb. 20, 2015; DOI: 10.1038/ncomms7362; pp. 1-9.
Weiyang Li et al; The synergetic effect of lithium polysulfide and lithium nitrate to prevent lithium dendrite growth; nature communications; article; Received Oct. 17, 2014; Accepted May 8, 2015; Published Jun. 17, 2015; DOI:10.1038/ncomms8436; pp. 1-8.

* cited by examiner

*Primary Examiner* — Gregg Cantelmo
(74) *Attorney, Agent, or Firm* — Reising Ethington P.C.

(57) ABSTRACT

The performance and durability of an electrochemical cell using a lithium metal based anode and a compatible lithium-accepting cathode are improved by the use of a suitable lithium electrolyte salt and a new liquid co-solvent mixture for the electrolyte. The co-solvent mixture comprises a non-aqueous ionic liquid, conductive of lithium ions, and a liquid fluorinated organic ether.

14 Claims, 2 Drawing Sheets

FLUORINATED ETHER AS ELECTROLYTE CO-SOLVENT FOR LITHIUM METAL BASED ANODE

TECHNICAL FIELD

Batteries employing a lithium metal anode, a compatible active cathode material, and a lithium-ion conducting electrolyte solution can provide useful high energy densities on both the gravimetric (Wh/kg) and volumetric (Wh/L) scales. The capacity (mAh) and cycle life of the battery are increased, and the plating and stripping of the lithium anode during charging and discharging of the battery are improved, by using a suitable combination of a lithium-containing electrolyte salt(s) and a co-solvent comprising an ionic liquid solvent component and a liquid fluorinated ether component.

BACKGROUND OF THE INVENTION

The material presented as background material in this section of the specification is not necessarily prior art.

Lithium metal is considered as an ideal anode material for rechargeable lithium batteries because of its low voltage potential, its high specific capacity (3860 mAh/g, 2062 mAh/ml), and the resultant high energy density. Anode materials such as $LiC_6$ and $Li_{3.75}Si$ have much lower related properties. But the lithium metal anode has to function in combination with a suitable electrolyte and retain its properties after repeated cycling of the cell in which it is working. Many different combinations of lithium electrolyte salts and non-aqueous solvents have been used and investigated. Often, the resulting cell compositions function such that the lithium metal anode is damaged as it is repeatedly plated with lithium and stripped of lithium, and the function of the cell is compromised and diminished. There remains a need for an improved electrolyte solvent for use in combinations of lithium metal anode materials with an electrolyte salt.

SUMMARY OF THE INVENTION

This invention pertains to electrochemical cells and batteries that use lithium metal based anodes. In accordance with practices of this invention, one or more lithium salts, an ionic liquid, and a fluorinated ether, or a mixture of fluorinated ethers, are used as co-solvents to form a non-aqueous solution of a lithium salt electrolyte which is used in combination with the lithium metal anode to improve the cycling efficiency and durability of the cell. The electrolyte solution is liquid at ambient temperatures (e.g., 25° C.) and at the intended operating temperatures of the cell or battery.

Lithium metal anodes may be used in many different types of cells and batteries. They are often used in the form of a thin layer deposit or lamination of lithium metal on a copper foil which serves as a current collector for the lithium anode. Such anodes may, for example, be in the form of round coins which may be stacked with a suitable porous separator and like-shaped cathode in a cell. In other individual cell or multi-cell assemblies, thin rectangular layers of the copper foil, coated on one or both sides with a thin layer of metallic lithium (e.g., up to 150 μm in thickness), may be stacked or rolled with like-shaped cathode layers and interposed porous separators. The porous structure of the assembly is carefully infiltrated with an electrolyte solution formed of a lithium salt dissolved in a non-aqueous liquid solvent. When the cell is being charged, lithium cations are transferred from the cathode through the electrolyte solution and "plated" on the lithium metal anode. When the cell is being discharged, lithium cations are "stripped" from the lithium metal anode and transferred through the electrolyte solution to the cathode. We have found that the compositions of the electrolyte and its solvent play an important role in the operation of a cell or battery with a lithium metal anode. In accordance with practices of our invention, the electrolyte solution is formed of a suitable lithium salt dissolved in a co-solvent mixture comprising at least an ionic liquid and a liquid fluorinated organic ether or mixture of fluorinated ethers. Additional non-aqueous solvents may be added, e.g., to modify the solid-electrolyte interphase (SEI) of the lithium metal or the viscosity of the electrolyte solution.

As an illustrative example, the electrolyte solution may consist of a one molar solution (1M) of lithium bis(fluorosulfonyl) imide in a mixture of an ionic liquid of N-methyl, N-butyl pyrrolidinium cations and bis(fluorosulfonyl) imide anions and n-propyl, 1,1,2,2-tetrafluoroethyl ether (ten volume percent of the solvent mixture). An electrolyte utilizing the ionic liquid and fluorinated ether co-solvent is found to increase the capacity (mAh) and charge-discharge cycle life of a lithium cell or battery using a lithium metal anode and one of many different compatible cathode materials. Further, the fluorinated ether-containing electrolyte co-solvent mixtures improve the quality of the plating and stripping of the lithium metal anode material during charging and discharging of the cell or battery. The undesirable formation of dendritic and/or mossy lithium deposits are reduced or eliminated.

For the purpose of beginning a description of the use of lithium metal anodes and their electrolytes, their use in lithium-ion cells and batteries may often be referenced, but the lithium metal anodes may be used with the subject electrolytes and co-solvents in many types of lithium-ion transporting electrochemical cells.

In general, cathode materials may be used which are suitable for lithium batteries. For example, these include lithium nickel manganese cobalt oxide (NMC), high energy forms of NMC, lithium manganese nickel oxide (LMNO), lithium iron phosphate (LFP), lithium cobalt oxide, sulfur, and manganese disulfide.

As stated, the electrolyte is composed of one or more lithium salts dissolved in a non-aqueous ionic liquid (sometimes IL in this specification) and a co-solvent including a fluorinated ether. The components of the co-solvent are liquids at ambient temperatures (e.g., 25° C.) and/or the intended operating temperature of the cell or group of cells. One molar and higher lithium electrolyte salt concentrations are usually suitable for use with the lithium metal anodes.

The lithium salts may, for example, be one or more of lithium bis(fluorosulfonyl) imide ($Li^+N^-(SO_2F)_2$, LiFSI), lithium trifluorosulfonimide ($Li^+N^-(SO_2CF_3)_2$, LiTFSI), lithium hexafluorophosphate ($LiPF_6$), lithium tetrafluoroborate ($LiBF_4$), lithium bis(oxalato) borate (LiBOB), and lithium oxalyldifluoroborate (LiODFB).

The ionic liquid portion of the co-solvent mixture (sometimes IL in this specification) may, for example be formed of either of N-methyl, N-butyl pyrrolidinium cations ($PYR14^+$), or N-methyl, N-propyl pyrrolidinium cations ($PYR13^+$) with either of bis(fluorosulfonyl) imide anions ($FSI^-$) or bis(trifluoromethane sulfonyl) imide anions ($TFSI^-$). An example of a suitable fluorinated ether is n-propyl-1,1,2,2-tetrafluoroethyl ether. Suitably the fluorinated ether is present in five to fifty volume percent of the co-solvent mixture. Additional suitable fluorinated ethers are disclosed below in this specification.

The co-solvent mixture may also comprise minor portions (e.g., up about thirty volume percent) of a liquid carbonate such as fluoroethylene carbonate (FEC), ethyl methyl carbonate (EMC), diethyl carbonate (DEC) or vinyl ethylene carbonate (VEC). For example, suitable quantities of these liquid additives may be used to modify the solid-electrolyte interphase (FEC and/or VEC) of the lithium metal or the viscosity (EMC and/or DEC) of the electrolyte solution.

The electrolyte composition comprising a suitable combination of a co-solvent comprising either PYR 14$^+$ or PYR 13$^+$ (cations) with either FSI$^-$ or TFSI$^-$ $^+$ (anions) as a first solvent component and a suitable portion of the fluorinated ether as a complementary solvent component for a selected lithium electrolyte salt is found to increase the capacity (mAh) and cycle life of a lithium cell or battery using a lithium metal anode and one of many different compatible cathode materials. Further, the IL and fluorinated ether-containing electrolyte co-solvent mixtures improve the quality of the plating and stripping of the lithium metal anode material during charging and discharging of the cell or battery.

Other objects and advantages of this invention will become apparent in view of the following examples of preferred embodiments of its practice.

The first electrolyte (filled-diamond data points) consisted of a 1M solution of LiPF$_6$ in equal portions of ethylene carbonate (EC) and ethyl methyl carbonate (EMC).

The second electrolyte (filled-circle data points) consisted of a 1 M solution of lithium bis(fluorosulfonyl) imide (Li$^+$ N$^-$(SO$_2$F)$_2$, LiFSI) in the ionic liquid formed of N-methyl, N-butyl pyrrolidinium cations (PYR14$^+$) and bis(fluorosulfonyl) imide anions (FSI$^-$).

The third electrolyte (open circle data points) consisted of a 1 M solution of lithium bis(fluorosulfonyl) imide (Li$^+$ N$^-$(SO$_2$F)$_2$, LiFSI) in a co-solvent consisting of N-methyl, N-butyl pyrrolidinium cations (PYR14$^+$) and bis(fluorosulfonyl) imide anions (FSI$^-$), plus ten percent by volume of n-propyl-1,1,2,2-tetrafluoroethyl ether.

Figure 1:
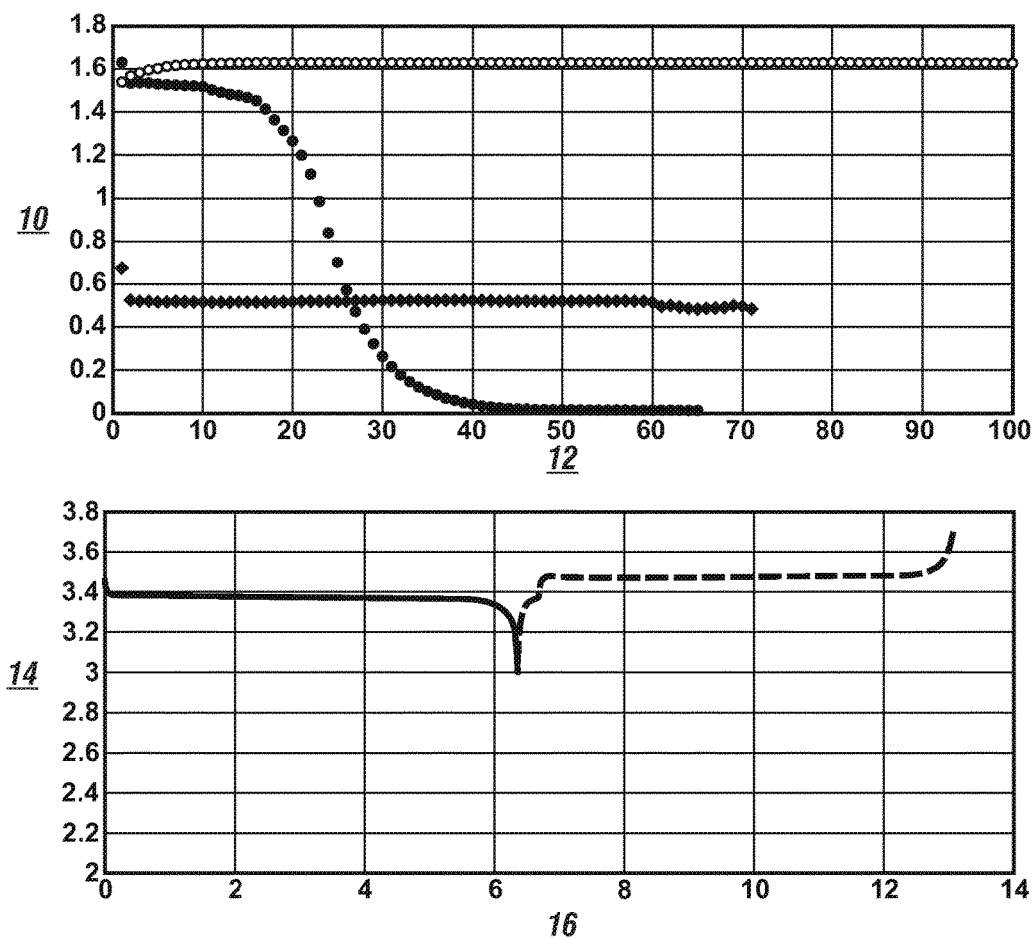
FIG. 1 presents a graph (upper graph of FIG. 1) of capacity (mAh, vertical axis, numeral 10) vs. cycle number (horizontal axis, numeral 12) of electrochemical cells formed of a lithium metal anode (20 micrometer-thick lithium layer laminated on a copper foil) and a lithium iron phosphate (LiFePO$_4$) cathode, each cell using one of three different electrolytes. Each such cycle consists of a discharge of the cell and a re-charging of the cell.

The graph at lower side of FIG. 1 summarizes Voltage (V, vertical axis, numeral 14) vs. time (h) (horizontal axis, numeral 16) for a single cycle of a discharge (solid line reflecting voltage provided during discharge) and re-charge (dashed line reflecting voltage required during recharging) of the Li—LiFePO$_4$ cell utilizing the third electrolyte co-solvent composition.

Figure 2:
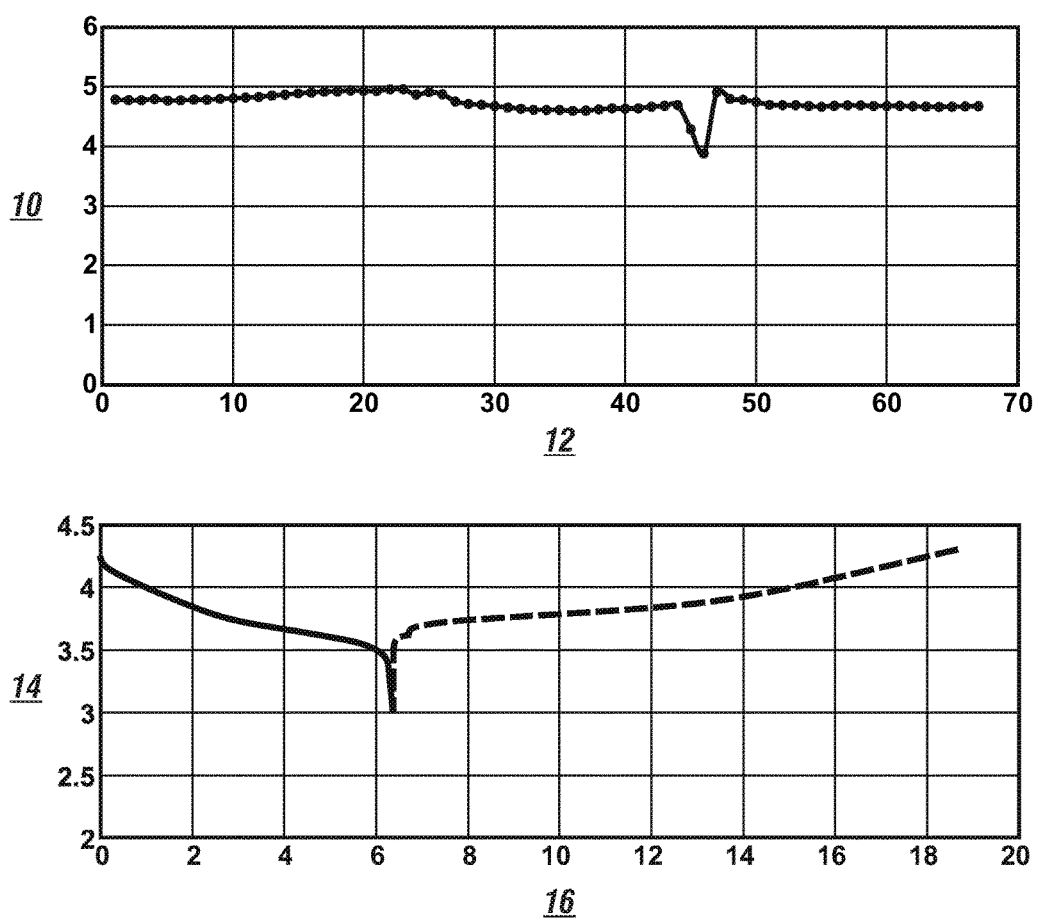

FIG. 2 presents an upper graph of capacity (mAh, vertical axis, numeral 10) vs. cycle number (horizontal axis, numeral 12) of a lithium metal anode (100 micrometer-thick lithium layer laminated on a copper foil) and a lithium nickel manganese cobalt oxide (Li(Ni$_{1/3}$Mn$_{1/3}$Co$_{1/3}$)O$_2$, NMC 111) cathode using an electrolyte consisting of a 1 M solution of lithium bis(fluorosulfonyl) imide (Li$^+$ N$^-$(SO$_2$F)$_2$, LiFSI) dissolved in a co-solvent consisting of N-methyl, N-butyl pyrrolidinium cations (PYR14$^+$) and bis(fluorosulfonyl) imide anions (FSI$^-$) plus ten percent by volume of n-propyl-1,1,2,2-tetrafluoroethyl ether. Again, each such cycle consists of a discharge of the cell and a re-charging of the cell.

The lower graph of FIG. 2 summarizes Voltage (V, vertical axis, numeral 14) vs. time (h, horizontal axis, numeral 16) for a discharge cycle (solid data line reflecting voltage provided during discharge) and a charge cycle (dashed data line reflecting voltage required during recharging) of the Li—Li(Ni$_{1/3}$Mn$_{1/3}$Co$_{1/3}$)O$_2$ cell utilizing the electrolyte co-solvent composition.

DESCRIPTION OF PREFERRED EMBODIMENTS

A group of cells formed of lithium metal anodes, one of two different cathode materials; lithium iron phosphate (LiFePO$_4$) and lithium nickel manganese cobalt oxide (NMC111); and different solutions of a lithium electrolyte salt in different non-aqueous liquid solvents were prepared and tested with respect to their respective direct current voltages during a discharge cycle and a charge cycle, cell capacities (mAh), and cycle lives. The data obtained from the testing of these cells are presented in FIGS. 1 and 2.

The cell test data presented in FIG. 1 was obtained from a cell assembled using an anode formed of a 20 micrometer thick layer of metallic lithium formed on a 10 μm thick copper foil formed of substantially pure copper with high electrical conductivity. The cell contained a cathode formed of a porous layer, 60 μm thick, of particles of lithium iron phosphate which were resin-bonded to an aluminum current collector foil (20 μm). One of three different electrolyte solutions was used in combination with an assembly of a lithium metal anode and a lithium iron phosphate cathode. The cell test data was obtained at about 25° C.

The first electrolyte solution was a one molar (1M) solution of lithium hexafluorophosphate (LiPF$_6$) in a solvent mixture formed of equal parts of ethylene carbonate (EC) and ethyl methyl carbonate (EMC). This electrolyte solution is considered to be a generally standard solution for use in a lithium-ion cell.

A second solution was prepared, formed of a 1M solution of lithium bis(fluorosulfonyl) imide (hereinafter LiFSI) in the ionic liquid formed of N-methyl, N-butyl pyrrolidinium cations and bis(fluorosulfonyl) imide anions (hereinafter 114).

A third electrolyte solution was prepared in accordance with a practice of this invention. The third solution was a 1M solution of LiFSI in a mixture of 114 and n-propyl-1,1,2,2-tetrafluoroethyl ether. The fluorinated ether constituted ten volume percent of the co-solvent mixture.

As stated, assembled Li—LiFePO$_4$ cells were prepared with one of each of the three described electrolyte solutions. The LiFePO$_4$ cathode was composed of a mixture of 90% by weight of LiFePO$_4$ powder, 5% carbon black (for electrical conductivity), and 5% binder (polyvinylidene difluoride dissolved in N-methyl-2-pyrrolidone. The slurry was coated as a uniform porous layer onto an aluminum current collector foil. The electrode with the coated porous layer of electrode material was dried overnight at 100° C. under vacuum.

The data presented in the upper graph of FIG. 1 summarizes the measured capacity (mAh, vertical axis) versus cycle number of the Li—LiFePO$_4$ cells (horizontal axis) with their respective electrolyte solutions as described in the above paragraphs. Each cell with one of the three electrolyte compositions was repeatedly discharged and re-charged between 3.0 and 3.7 volts at a 0.5 C rate.

As reflected in the data point curve of dark filled circles of FIG. 1, the Li—LiFePO$_4$ cell with the standard 1M LiPF$_6$-EC:EMC electrolyte solution survived less than twenty cycles due to its low Li cycling capability, around 77%.

As reflected in the data point curve of dark-filled diamonds, of FIG. 1, the Li—LiFePO$_4$ cell with the 1M LiFSI-I14 electrolyte solution provided quite low capacity, about 0.5 mAh. This is believed to be due to the high viscosity of the LiFSI-PYR14$^+$ FSI$^-$ solvent, around 100 millipascal-second.

But, as seen in the data point curve of open circles of FIG. 1, the Li—LiFePO$_4$ cell with the 1M LiFSI-I14+fluorinated ether co-solvent solution provided a high capacity (99% of its full capacity) over at least one hundred discharge/recharge cycles due to the decrease of the electrolyte viscosity with the addition of n-propyl-1,1,2,2-tetrafluoroethyl ether and the complementary effect of the fluorinated ether in the electrolyte composition. The lithium deposits on the anode remained smooth and free of capacity-reducing dendrites and mossy shapes, with Li/Li$^+$ cycling efficiency around 99.1%, compared to the 77% with the use of the carbonate-based electrolyte solvent. It is believed that both the specific composition of the co-solvents and their viscosity contribute to the overall high capacity and long cycle life of the cell.

It is seen that the baseline electrolyte (dark-filled circle data points), the 1M LiPF$_6$-EC:EMC only cycles around twenty to times before losing energy-producing capacity due to its low efficiency (around 77%) with Li metal.

In the example of the 1M LiFSI-PYR14$^+$ FSI$^-$ electrolyte, we can see the capacity is quite low, compared to the other electrolyte formulations, even though the cathode loading is same. This low capacity for the 1M LiFSI-PYR14$^+$ FSI$^-$ electrolyte is attributed, at least in part, to the high viscosity of the ionic liquid. It is recognized that the viscosity of EMC is only 0.65 cP, and the viscosity of the mixture of EMC with EC is comparable. But the viscosity of the ionic liquid, PYR14$^+$ FSI$^-$, is 52.7 cP, which is believed to adversely affect the low capacity of the cell. The viscosity of the similar ionic liquid, PYR13$^+$ FSI$^-$, is of a like high-viscosity level. But the fluorinated ether, n-propyl-1,1,2,2-tetrafluoroethyl ether, has a low viscosity, comparable to the viscosities of the alkyl carbonate solvents, EC and EMC. The fluorinated ether also assists in helping the electrochemical function of the Li—LiFePO$_4$ cell. In FIG. 1 we can see (open circle data curve) that, not only the cycling performance is greatly improved, but the capacity is fully gained, compared to the one without the solvent including the fluorinated ether.

The lower graph of FIG. 1 summarizes the voltage (V) (vertical axis 14) versus time (h) data (horizontal axis, 16) for the Li—LiFePO$_4$ cell with the 1M LiFSI-I14+fluorinated ether co-solvent solution as it discharged (solid line curve) and subsequently immediately re-charged (dashed line curve). It is seen that the cell produced a steady voltage of about 3.4 V during discharge and, as expected, required a slightly higher voltage as it was re-charged.

The two graphs presented in FIG. 2 present data obtained testing an assembled Li—Li(Ni$_{1/3}$Mn$_{1/3}$Co$_{1/3}$)O$_2$ cell. The Li-NMC111 cell was assembled with an electrolyte consisting of a 1M solution of LiFSI in a mixture of 114 and n-propyl-1,1,2,2-tetrafluoroethyl ether (ten volume percent).

The data presented in the upper graph of FIG. 2 summarizes the measured capacity (mAh, vertical axis, numeral 10) versus cycle number (horizontal axis, numeral 12) of the Li-NMC111 cell with its electrolyte solution described in the above paragraphs. The NMC111 cathode is composed of a mixture of 90% by weight of Li(Ni$_{1/3}$Mn$_{1/3}$Co$_{1/3}$)O$_2$ powder, 5% carbon black (for electrical conductivity), and 5% binder (polyvinylidene difluoride dissolved in N-methyl-2-pyrrolidone. The slurry was coated as a uniform porous layer onto an aluminum current collector foil. The electrode with the coated porous layer of electrode material was dried overnight at 100° C. under vacuum.

The testing was performed as described with respect to the presentation of the data of the upper graph of FIG. 1. The durability and performance of the Li—Li(Ni$_{1/3}$Mn$_{1/3}$Co$_{1/3}$)O$_2$ cell with the 1M LiFSI-I14+10% fluorinated ether electrolyte was seen as performing very well.

The lower graph of FIG. 2 summarizes Voltage (V, vertical axis, numeral 14) vs. time (h, horizontal axis, 16) for a discharge and charge cycle of the Li—Li(Ni$_{1/3}$Mn$_{1/3}$CO$_{1/3}$)O$_4$ cell utilizing the electrolyte co-solvent composition. It is seen that, during discharge, the cell produced a slowly declining voltage from about 4.2 V to about 3.5 V over a six hour discharge period. Again, during charging, the cell required a steadily increasing potential. The cell was discharged at a C/5 rate and charged at a C/15 rate As described above in some specific illustrations, the ionic liquid portion of the co-solvent mixture may, for example be formed of either of N-methyl, N-butyl pyrrolidinium cations (PYR14$^+$), or N-methyl, N-propyl pyrrolidinium cations (PYR 13$^+$) with either of bis(fluorosulfonyl) imide anions (FSI$^-$) or bis(trifluoromethane sulfonyl) imide anions (TFSI$^-$). The following ionic liquids also are suitable for use in embodiments of this invention: N-ethyl-N-methyl piperidinium bis(fluorosulfonyl) imide, N-propyl-N-methyl piperidinium bis(fluorosulfonyl) imide, 1-butyl-1-methyl pyrrolidinium bis(fluorosulfonyl) imide, 1-methyl-1-(2-methoxyethyl) pyrrolidinium bis(fluorosulfonyl) imide, and N-propyl-N-methyl pyrrolidinium bis(fluorosulfonyl) imide.

Also, additional fluorinated ethers are suitable for use in embodiments of this invention. The fluorinated ethers include: 1,1,2,2-tetrafluoroethyl 2,2,3,3-tetrafluoropropyl ether, 1,2,2,2-tetrafluoroethyl methyl ether, n-Butyl 1,1,2,2-tetrafluoroethyl ether, 1H,1H,2'H,3H-Decafluorodipropyl ether, bis(2,2,2-trifluoroethyl)ether, ethyl 1,1,2,2-tetrafluoroethyl ether, difluoromethyl 2,2,3,3,3-pentafluoropropyl ether, 2,2,2-trifluoroethyl 1,1,2,2-tetrafluoroethyl ether, difluoromethyl 2,2,3,3-tetrafluoropropyl ether, propyl 1,1,2,2-tetrafluoroethyl ether, 1,1-difluoroethyl 2,2,2-trifluoroethyl ether, isopropyl 1,1,2,2-tetrafluoroethyl ether, bis(2,2-difluoroethyl)ether, and 1,1,2,2-tetrafluoroethyl isobutyl ether.

Thus, the performance of an electrochemical cell, or group of cells, utilizing a lithium metal anode and a compatible cathode material is significantly enhanced by the use of an electrolyte composed of one or more lithium salts dissolved in co-solvents comprising a non-aqueous ionic liquid and a fluorinated ether. The anode and cathode members may be formed in any of many known structures and shapes. A single facing anode and cathode, spaced apart by a thin porous separator layer may be used in a battery. The porous separator layer and the anode and cathode materials are infiltrated with, or otherwise contacted by, an electrolyte solution as described in this specification. Or a battery may be formed of a grouping of alternating anode and cathode shapes, spaced by a porous separator, in which the grouping is stacked or rolled or otherwise configured into a desired structure. As stated, the resulting assembly of lithium metal anode(s) and complementary cathode(s) is infiltrated or otherwise suitable wetted with the electrolyte solution of this specification and invention.

The subject invention is described by use of illustrative examples which are not intended to limit the scope of the claimed invention.

The invention claimed is:

1. An electrochemical cell comprising a lithium metal anode, a lithium-containing or lithium-accepting cathode, and a non-aqueous liquid electrolyte comprising a lithium salt dissolved in a co-solvent comprising an ionic liquid conductive of lithium ions and a liquid fluorinated ether;
    wherein the lithium salt consists of one or more of lithium bis(fluorosulfonyl)imide, lithium trifluorosulfonimide, and lithium oxalydifluoroborate; and
    wherein the ionic liquid consists of either N-methyl, N-butyl pyrrolidinium cations or N-methyl, N-propyl pyrrolidinium cations with either bis(fluorosulfonyl) imide anions or bis(trifluoromethane sulfonyl)imide anions.

2. An electrochemical cell as stated in claim 1 which is capable of producing a voltage of at least 3.4 volts over a period of 100 cycles of discharge and re-charge.

3. An electrochemical cell as stated in claim 1 in which the lithium metal anode is formed of a layer of lithium metal deposited on a copper current collector substrate.

4. An electrochemical cell as stated in claim 1 in which the thickness of the lithium metal anode is up to one hundred micrometers and it is deposited on a copper metal current collector substrate.

5. An electrochemical cell as stated in claim 1 in which the liquid fluorinated ether constitutes five to fifty percent by volume of the ionic liquid and fluorinated ether mixture.

6. An electrochemical cell as stated in claim 1 in which the lithium-containing or lithium-accepting cathode is a material selected from the group consisting of lithium nickel manganese cobalt oxide, lithium manganese nickel oxide, lithium iron phosphate, lithium cobalt oxide, sulfur, and manganese disulfide.

7. An electrochemical cell as stated in claim 1 in which the fluorinated ether is n-propyl-1,1,2,2-tetrafluoroethyl ether and it is present in an amount equal to five to fifty volume percent of its mixture with the ionic liquid.

8. An electrochemical cell as stated in claim 1 in which the fluorinated ether consists of one or more of 1,2,2,2-tetrafluoroethyl methyl ether, n-butyl 1,1,2,2-tetrafluoroethyl ether, 1H,1H,2'H,3H-decafluorodipropyl ether, bis(2,2,2-trifluoroethyl)ether, ethyl 1,1,2,2-tetrafluoroethyl ether, 1,1,2,2-tetrafluoroethyl 2,2,3,3-tetrafluoropropyl ether, difluoromethyl 2,2,3,3,3-pentafluoropropyl ether, 2,2,2-trifluoroethyl 1,1,2,2-tetrafluoroethyl ether, difluoromethyl 2,2,3,3-tetrafluoropropyl ether, propyl 1,1,2,2-tetrafluoroethyl ether, 1,1-difluoroethyl 2,2,2-trifluoroethyl ether, isopropyl 1,1,2,2-tetrafluoroethyl ether, bis(2,2-difluoroethyl)ether, and 1,1,2,2-tetrafluoroethyl isobutyl ether.

9. An electrochemical cell comprising a lithium metal anode formed of a layer of lithium metal deposited on a copper current collector substrate, a lithium-containing or lithium-accepting cathode, and a lithium salt dissolved in a non-aqueous liquid co-solvent comprising an ionic liquid conductive of lithium ions and a liquid fluorinated ether, the liquid fluorinated ether being present in an amount equal to five to fifty volume percent of its mixture with the ionic liquid in which the lithium electrolyte salt consists one or both of lithium bis(fluorosulfonyl) imide and lithium trifluorosulfonimide.

10. An electrochemical cell as stated in claim 9 in which the non-aqueous liquid co-solvent comprises N-methyl, N-butyl pyrrolidinium cations and bis(fluorosulfonyl) imide anions and n-propyl-1,1,2,2-tetrafluoroethyl ether.

11. An electrochemical cell as stated in claim 9 in which the non-aqueous co-solvent comprises an ionic liquid of N-methyl, N-propyl pyrrolidinium cations and bis(trifluoromethane sulfonyl) imide anions and n-propyl-1,1,2,2-tetrafluoroethyl ether.

12. An electrochemical cell as stated in claim 9 in which the non-aqueous liquid co-solvent consists essentially of an ionic liquid of N-methyl, N-butyl pyrrolidinium cations and bis(fluorosulfonyl) imide anions and n-propyl-1,1,2,2-tetrafluoroethyl ether.

13. An electrochemical cell as stated in claim 9 in which the non-aqueous co-solvent consists essentially of an ionic liquid of N-methyl, N-propyl pyrrolidinium cations and bis(trifluoromethane sulfonyl) imide anions and n-propyl-1,1,2,2-tetrafluoroethyl ether.

14. An electrochemical cell as stated in claim 9 in which the non-aqueous co-solvent further comprises a liquid carbonate selected from the group consisting of fluoroethylene carbonate, ethyl methyl carbonate, diethyl carbonate, and vinyl ethylene carbonate, the liquid carbonate being present in an amount up to about thirty volume percent of the non-aqueous co-solvent.

\* \* \* \* \*